United States Patent [19]

Benedyk

[11] Patent Number: 5,720,511
[45] Date of Patent: *Feb. 24, 1998

[54] FRAME APPARATUS AND PROCESS FOR THE MANUFACTURE OF SAME

[75] Inventor: Joseph C. Benedyk, Lake Zurich, Ill.

[73] Assignee: Alumax Extrusions, Inc., West Chicago, Ill.

[*] Notice: The term of this patent shall not extend beyond the expiration date of Pat. No. 5,458,393.

[21] Appl. No.: 543,440

[22] Filed: Oct. 16, 1995

Related U.S. Application Data

[63] Continuation-in-part of Ser. No. 105,368, Aug. 11, 1993, Pat. No. 5,458,393.
[51] Int. Cl.⁶ .................................................. B60R 27/00
[52] U.S. Cl. .......................... 296/203; 296/205; 280/798
[58] Field of Search ................................ 296/205, 203; 280/796, 785, 798

[56] References Cited

U.S. PATENT DOCUMENTS

| 2,107,382 | 2/1938 | Maddock | 280/798 X |
| 2,174,922 | 10/1939 | Kuiper | 280/798 X |
| 2,194,349 | 3/1940 | Almdale | 280/798 |
| 4,735,355 | 4/1988 | Browning | 228/189 |
| 4,766,664 | 8/1988 | Benedyk | 29/512 |
| 4,907,735 | 3/1990 | Ushioda | 228/173.4 |

FOREIGN PATENT DOCUMENTS

| 2131361 | 8/1984 | United Kingdom . |
| 893065896 | 1/1990 | United Kingdom . |

Primary Examiner—Joseph D. Pape
Attorney, Agent, or Firm—Dick and Harris

[57] ABSTRACT

A frame apparatus, and process for constructing same, for use in the construction of various vehicles. The apparatus comprises one or more frame members, each fabricated from a single longitudinal extrusion, and one or more cross-members. The frame members include a predetermined number of regions softened through a localized heating process. The softened regions are bent to varying radii in predetermined directions relative to the profile of a specific frame configuration and then allowed to harden back toward their pre-softened hardness.

17 Claims, 2 Drawing Sheets

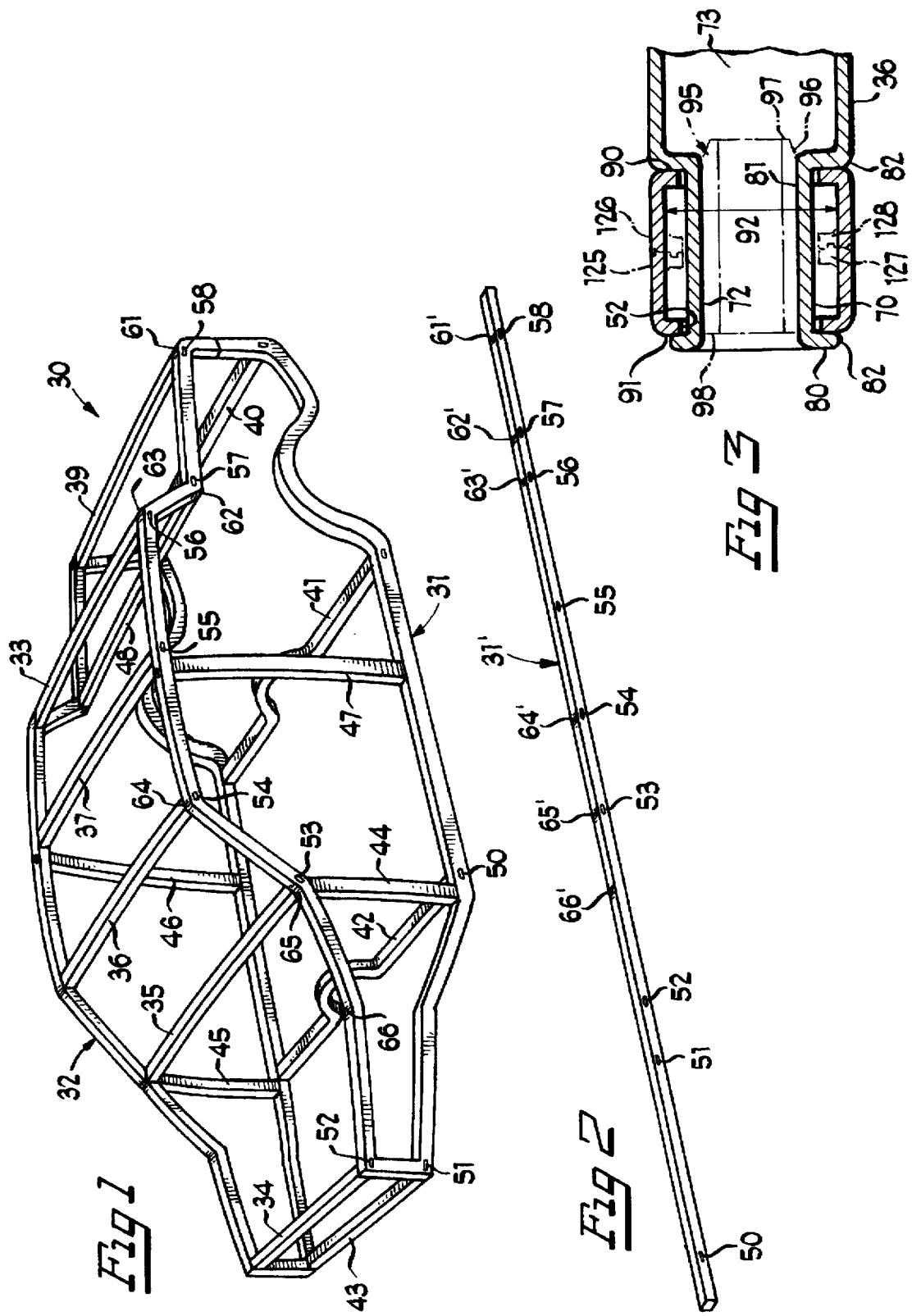

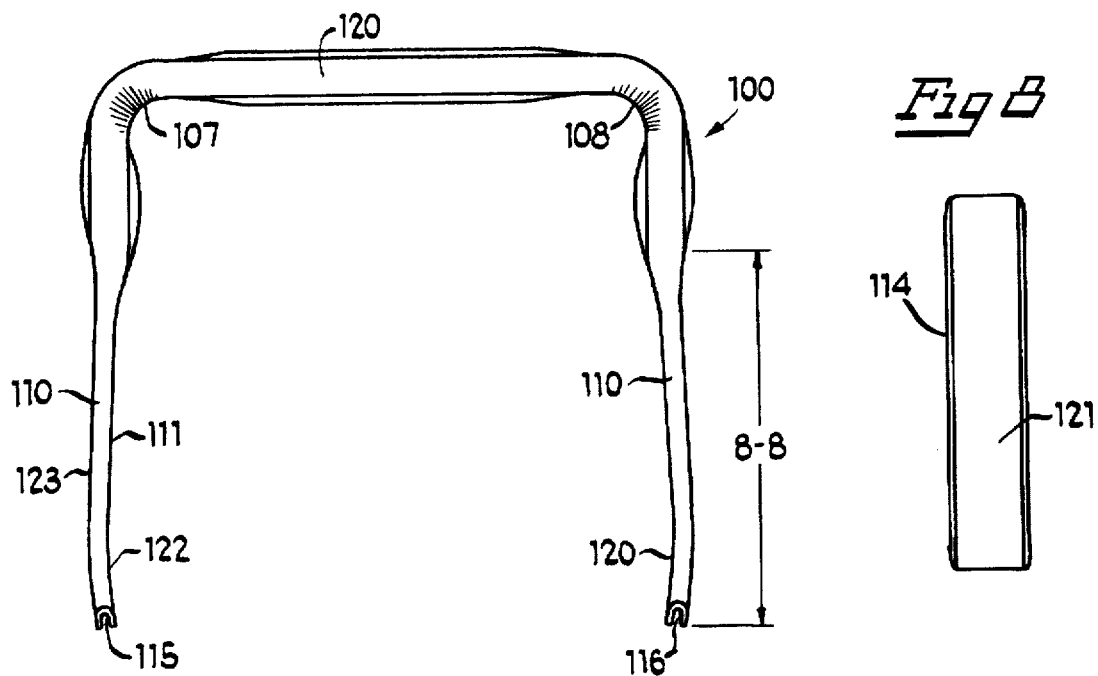
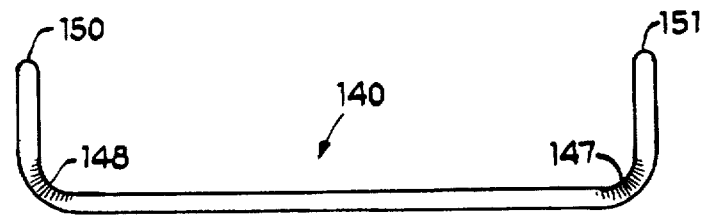
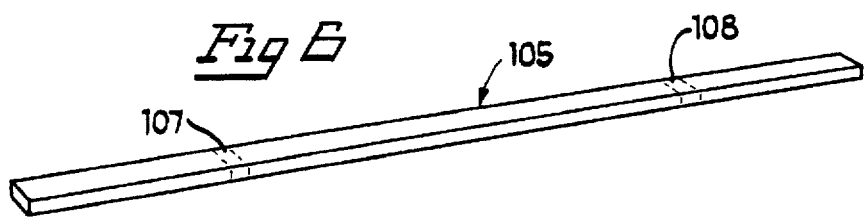
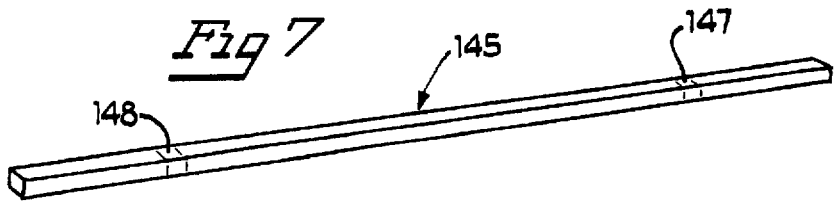

FRAME APPARATUS AND PROCESS FOR THE MANUFACTURE OF SAME

This is a continuation-in-part of U.S. application Ser. No. 08/105,368 filed Aug. 11, 1993, now U.S. Pat. No. 5,458,393.

BACKGROUND OF THE INVENTION

The present invention relates in general to frame apparatus and associated processes for manufacturing same.

Frame apparatus, and, more particularly, frame apparatus for use in association with various vehicles, have been know in the art for several years. Typically, such frame apparatus have been constructed from various metal structures, such as aluminum alloy extrusions. For example, when fabricating a vehicular seat frame, it may be desirous to construct the seat frame from a 6000 series aluminum alloy. Inasmuch as a seat frame typically requires bends of relatively tight radii, a relatively ductile aluminum, such as 6000 series having a –T4 temper, is typically required. Unfortunately, a –T4 temper aluminum does not possess the superior native hardness associated with, for example, 6000 series at a –T6 temper hardness—a hardness more desirable for a seat frame then that associated with –T4 temper. While a –T6 temper would provide great structural advantages to the finished seat frame, its use for such an application is typically not employed since it is not ductile enough for fabrication of the tight bends/radii (without cracking) associated with structures such as an automotive seat frame, bumper and/or space frame, to name a few.

While it is known that a –T4 temper aluminum can be heat treated, and then aged over a period of time to provide a hardness somewhat comparable to that of a –T6 temper, such a process would require heating of the entirety of the alloy (typically prior to bending), followed by a relatively lengthy aging process. Furthermore, the resultant structural properties associated with the final hardened product are typically far from consistent—even throughout the same piece of hardened material. Accordingly, it would not be uncommon for such a product to have portions exhibiting acceptable structural properties relative to a –T6 temper hardness, while other portions would exhibit less than acceptable, or desired, structural properties—thereby resulting in a structure, such as identified above, which could inadvertently fatigue and possibly contribute to a greater propensity for human injury upon such fatigue.

Accordingly, while it is known that the hardness of an aluminum alloy can be altered through conventional heat treating and aging techniques, none of such prior art teaches, much less discloses, one or more frame members which include preliminarily pre-softened regions, which are softened through localized heating, and, wherein the one or more frame members are then bendable to varying radii in any predetermined direction relative to a particular frame configuration. Furthermore, none of such prior art teaches, much less discloses the ability to substantially maintain the structural integrity of the frame members at their native hardness when heat treatment to only specific portions of the structure are deemed necessary.

It is thus an object of the present invention to provide a frame apparatus constructed from one or more frame members which have a plurality of predetermined areas pre-softened through localized heating so as to facilitate bending to varying predetermined radii in predetermined directions relative to a specific frame configuration, and, wherein the bent regions are then allowed to harden back toward a desired hardness—without causing cracks to the bends.

It is yet another object of the present invention to provide a frame apparatus constructed wherein such localized heating serves as a control mechanism for substantially maintaining the native structural properties of the non-pre-softened portions of the frame members.

It is still further an object of the present invention to provide a frame apparatus wherein the material used for the frame apparatus exhibits a native hardness generally considered preferable for the frame apparatus, while also exhibiting a native ductility generally considered to low for producing bends of relatively tight radii, and wherein such material can be selectively structurally altered to at least a temporary, more applicable ductility, for forming the bends, without cracking thereto—without any significant altering of the native structural properties of the remainder of the material.

These and other objects of the present invention will become apparent in light of the present Specification, Claims and Drawings.

SUMMARY OF THE INVENTION

The present invention comprises a frame apparatus for use in association with vehicles, such as automotive and aviation vehicles. The frame apparatus comprises one or more frame members each including one or more pre-selected attachment regions. The invention also includes one or more cross-member means each having at least a first end operably attached to the one or more frame members at corresponding ones of the one or more pre-selected attachment regions.

Slot means are integrally formed through at least a portion of the one or more pre-selected attachment regions for operably accepting at least a portion of corresponding respective ones of the first ends of the one or more cross-member means. In addition, securement means are operably associated with at least a portion of each of the first ends of the one or more cross-member means and the corresponding slot means for operably securing the first end of the one or more cross-member means within the corresponding slots means of the one or more frame members. The securement means further include at least a portion of the first end of the cross-member means being softened through localized heating and then deformed so as to maintain the restrained operable positioning of the first end within the corresponding slot means.

In a preferred embodiment of the invention, the operable acceptance of the at least a portion of the first end of the cross-member means within the corresponding slot means describes a joint between the cross-member means and the one or more continuous outer frame means. The frame apparatus further includes strength enhancement means which are operably associated with the joint for imparting increased structural integrity thereto, to, in turn, increase rigidity against imparted stress at the joint.

In another preferred embodiment, the frame members include at least one pre-softened region softened through localized heating at the pre-softened regions and at least one non-pre-softened region. The at least one pre-softened region facilitates bending of the one or more frame portions at varying radii in any desired dimension.

It is preferred that at least one of the one or more frame members be constructed of aluminum material from the group comprising 4000 to 6000-series alloys of varying hardnesses. However, it will be understood that the invention is also applicable when frame members constructed of different materials, for example, aluminum and steel, among others, are attached to each other.

The invention further includes a process of manufacturing a frame structure apparatus. A preferred process comprises the steps of a) forming slots in the one or more bendable frame members at the pre-selected attachment regions, wherein the slots include an inner peripheral surface and an outer peripheral surface; b) softening predetermined areas on the one or more frame members through localized heating; c) bending the one or more bendable frame members at each of the predetermined areas to varying predetermined radii at predetermined directions relative to a specific frame configuration; d) at least partially hardening the predetermined softened areas after bending the one or more bendable frame members so as to increase structural integrity to the predetermined areas; e) forming at least one cross-member with at least a first end having a distal end, a proximal end and a cross-sectional configuration; f) softening the proximal end of the at least one cross-member through localized heating; g) inserting the first end of the at least one cross-member in corresponding ones of the slots in the bent one or more frame members so as to form a joint therebetween each respectively; h) deforming at least a portion of the softened proximal ends of each of the first ends so as to alter the pre-deformed cross-sectional configuration of same to, in turn, create a detent portion operably positioned adjacent the inner peripheral surface of a corresponding slot for precluding over insertion of the first ends into the corresponding slots in the one or more frame members; and i) hardening the locally softened proximal ends back toward the pre-softened hardnesses.

In a preferred embodiment, the process further includes the steps of j) softening the distal ends of the first ends of the at least one cross-member through localized heating; k) deforming at least a portion of the softened distal ends of the first ends of the at least one cross-member so as to form a flange portion operably positioned adjacent the outer peripheral surface of corresponding ones of the slots; and L) hardening the locally softened distal ends back toward their pre-softened hardnesses, after the step of softening the proximal ends of the at least one cross-member through localized heating. The flange portion and the detent portion compress against the outer and inner peripheral surface, respectively, of the slots, so as to substantially lock the first ends within the corresponding slots.

In this preferred embodiment, the step of bending the one or more bendable frame members at each of the predetermined areas to varying predetermined radii and predetermined directions relative to a specific frame configuration further includes the step of positioning the bent portions of the one or more bendable outer frame members in any desired dimension so as to form a frame apparatus constructed from one or more frame members.

In another preferred embodiment, a frame apparatus is disclosed for use in association with vehicles, such as automotive and aviation vehicles comprising one or more frame members. Each of the frame members include at least one pre-softened region through localized heating at the pre-softened regions, and at least one non-pre-softened region. The pre-softened regions facilitate bending of the one or more frame members at varying radii in any desired dimension without structurally altering material or structural properties of the non-pre-softened regions.

In yet another preferred embodiment of the invention, at least one of the bent one or more frame members may comprise a vehicular bumper, a vehicular seat frame, or an automotive space frame. Of course, other frame types for use in association with automotive and aviation vehicles are also contemplated.

The invention further comprises another preferred process of manufacturing a frame apparatus for use in association with vehicles, wherein the frame structure apparatus is constructed with one or more bendable frame members. Such a preferred process comprises the steps of a) softening predetermined areas on the one or more frame members through localized heating while maintaining at least one predetermined area on the one or more frame members in a non-pre-softened condition; b) bending the one or more bendable frame members at each of the predetermined softened areas to varying predetermined radii in predetermined directions relative to a specific frame configuration; and c) hardening the predetermined softened areas to a desired hardness after bending the one or more bendable frame members so as to obtain a desired structural integrity of the previously predetermined softened areas without altering structural properties of the non-softened areas.

In this preferred embodiment of the invention, the process further includes the step of extruding an aluminum billet so as to form one or more substantially straight extrusions to be used as the one or more bendable frame members.

The invention further comprises a product made in accordance with the above-identified process wherein the product comprises a vehicular bumper, a vehicular seat frame as well as a vehicular space frame. Of course other vehicle related components and/or frame structures are also contemplated by the above-identified process.

BRIEF DESCRIPTION OF THE DRAWINGS

FIG. 1 of the drawings is a perspective view of the present frame apparatus showing, in particular, the outer frame members, the cross-member means used to maintain the frame members in an erected orientation, as well as the flanged portions of one of the ends of each of the cross-member means operably secured against the outer peripheral surface of a corresponding slot means;

FIG. 2 of the drawings is a perspective view of a substantially linear shaft which is used to form one of the frame members of FIG. 1, showing, in particular, the slot means operably formed at predetermined locations thereon, as well as the pre-softened regions which will facilitate appropriate bending thereat;

FIG. 3 of the drawings is an enlarged cross-sectional view of one of the cross-member means of FIG. 1 as well as the corresponding slot means of the frame members, showing, in particular, the collar portion and flange portion of the end of the cross-member means operably compressing the inner and outer peripheral surfaces, respectively, of the slot means so as to result in a locked compression fit of the cross-member to the frame members, as well as showing an optional ferrule inserted within the channel region of the end of the cross-member means;

FIG. 4 of the drawings is a front elevational view of another preferred embodiment of the present frame apparatus, showing, in particular, the configuration of a vehicular seat-back frame;

FIG. 5 of the drawings is a front elevational view of another preferred embodiment of the present frame apparatus, showing, in particular, the configuration of a vehicular bumper frame;

FIG. 6 of the drawings is a perspective view of a relatively straight extrusion with two predetermined areas to be softened;

FIG. 7 of the drawings is a perspective view of a relatively straight extrusion with two predetermined areas to be softened; and FIG. 8 of the drawings is a sectional view of FIG. 4 taken along lines 8—8.

BEST MODE FOR PRACTICING THE INVENTION

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Frame apparatus 30 of the present invention is shown in FIG. 1 as an automotive space frame comprising two outer frame members 31 and 32 and cross-member means 34 through 48. Outer frame members 31 and 32 both include a plurality of pre-selected attachment regions (slot means), such as slot means 50 through 58, as shown more clearly on substantially linear shaft 31' (FIG. 2), which will be used to form outer frame member 31, and a plurality of bent regions, such as bent regions 61 through 66. As will be further explained in detail hereinbelow, each of the bent regions are formed as the result of softening predetermined locations 61' through 66' on substantially linear shaft 31' (FIG. 2) through localized heating, and then bending the shaft at each of the predetermined softened locations to varying predetermined radii in predetermined directions so as to conform to a specific frame configuration, such as the automotive space frame vehicle configuration shown in FIG. 1.

As will also be explained, and which will be applicable for all embodiments of the present invention, the localized heating will not have any significant effect on the structural properties of the non-heated portions of the particular structure. Accordingly, if the required bends/radii for a particular structure can only typically be fabricated through use of an alloy having a particular ductility, while the remainder of the structure preferably requires a uniform hardness greater than the native hardness of the alloy possessing the required ductility, then the localized heat treatment will prove quite beneficial. Indeed the present process and associated structure will, if desired, result in a frame apparatus wherein only the structural properties associated with the portions to be bent become significantly altered (e.g. softened)—without altering the structural properties of the remainder of the apparatus. Accordingly, if the material of choice for the particular frame apparatus is, for example, 6000 series aluminum alloy having a −T6 temper (due to its hardness), but the particular bends/radii required for the particular frame apparatus can only be made with a relatively soft alloy, such as 6000 series having a −T4 or −T2 temper (so as to avoid cracking at the bends), the −T6 temper can nonetheless be used. Indeed, while the regions, which will not be exposed to heat treating (the regions which do not require significant bending) will maintain a uniform, unaltered native −T6 temper hardness, the regions to be bent will have been heat treated in accordance with the present process for a predetermined period of time so as to at least temporarily alter the ductility of those bends to that of, for example, a freshly quenched −T4 temper. The bends can then be brought back toward a −T6 temper hardness level, if desired, by aging at 300 degrees–400 degrees F. Of course, the amount of time of aging will effect the particular hardness at the bends.

With respect to frame apparatus 30, slots, such as slot 52 (FIG. 2), which operably accept a portion of corresponding ones of the cross-member means, such as cross-member means 36, each include an inner peripheral surface 90, an outer peripheral surface 91 and an inner dimension 92.

Cross-member means, such as cross-member means 36, is shown in FIG. 3, as including a first end, such as first end 70, a second end (not shown), an interior surface, such as interior surface 72, and an inner dimension defining a channel region 73. The first and second ends of the cross-member means each include a distal end, such as distal end 80, having a flange portion, such as flange portion 83, and a proximal end, such as proximal end 81, having a detent, or collar portion, such as collar portion 82. In this embodiment, collar portion 82 may be formed by swaging first end 70 of the cross-member means—although other techniques for forming the collar, such as by pinching or crimping, are also contemplated.

Each of the first and second ends of the cross-member means are operably inserted into a corresponding slot, such as corresponding slot 52 (FIG. 2) where they are then secured in place so as to maintain frame apparatus 30 in an erected orientation, as shown in FIG. 1. Such securement results from a locked joint between the ends of the cross-member means and the corresponding slots. Additionally, such a locked joint is achieved as the result of the collar portion, such as collar portion 82, of the cross-member means, such as cross-member means 36, compressing against inner peripheral surface, such as inner peripheral surface 90, of corresponding slot 52, and then forming and positioning flange portion, such as flange portion 83, so that it is squeezing against outer peripheral surface, such as outer peripheral surface 91, of corresponding slot 52—so as to result in a compression fit therebetween. Such flanged and collared portions are formed by softening the respective distal and proximal ends of the cross-member means through localized heating, and then deforming same until the collar and flange portions are created.

Strength enhancement means 95 is shown in alternative form in FIG. 3 as comprising a sleeve member, or ferrule, having an outer surface 96, an inner edge 97, and an outer edge 98. The sleeve member is inserted within channel region 73 of a respective end, such as first end 70, of cross-member means, such as cross-member means 36, so as to increase rigidity to the joint formed upon insertion of the respective ends of the cross-member means within the corresponding slot means, such as slot means 52. Securement of sleeve member 95 to the cross-member means can be obtained by way of an interference fit between outer surface 96 of the sleeve member and at least a portion of channel region, such as channel region 73 (FIG. 3), of the respective end of the corresponding cross-member means— although other conventional securement techniques, such as welding or adhesive bonding of the sleeve member to the cross-member means are also contemplated.

Vehicular seat apparatus 100 is shown in FIG. 4 and FIG. 8 as comprising side walls 110, 111 and 113, 114, tight bend regions 107 and 108—all of which had been originally pre-softened through localized heating—ends 115 and 116 and non-heat treated portions, such as 120–123. Vehicular bumper apparatus 140 is shown in FIG. 5 as comprising tight bend regions 147 and 148—originally pre-softened through localized heating—and ends 150, 151.

Inasmuch as the process for forming the frame structure of FIG. 1 has generally been disclosed in co-pending parent application U.S. Ser. No. 08/105,368, further explanation of the process will only be explained with respect to other frame structures, such as vehicular seat apparatus 100 (FIG. 4) or vehicular bumper apparatus 140 (FIG. 5). Of course, it will be understood to those with ordinary skill in the art that the present process will also be applicable to other types of automotive and aviation related accessories, components and/or frames.

The process for constructing vehicular bumper apparatus 100 and vehicular seat frame apparatus 140 (FIG. 4 and FIG. 5, respectively) is achieved by first extruding linear sections 105 (FIG. 6) and 145 (FIG. 7) and then quenching the extrusions at press. Although several types of materials can be used for such extrusions, aluminum alloys of the 6000-series of varying hardnesses are preferred.

After the extrusions have been quenched, they are substantially straightened and then heat treated and cut to a particular length suitable for the particular frame configuration required. Accordingly, once cut, a specified number of predetermined regions, such as predetermined regions 107 and 108 (FIG. 4) and 147 and 148 (FIG. 5) are softened through localized heating so as to at least temporarily increase ductility to the linear extrusions at the predetermined softened regions.

One such acceptable method for softening the predetermined regions by localized heating is disclosed in U.S. Pat. No. 4,766,664, issued to Joseph C. Benedyk, for a Process for Formation of High Strength Aluminum Ladder Structures. In such a process, an induction coil is placed in operable contact with the specific area to be heated, and, in turn, softened—with only minimal conductivity to adjacently positioned portions of the softened region. Indeed, with respect to vehicular seat apparatus 100 (FIG. 4) only the side walls 110, 111 and 113, 114 extending from ends 115 and 116, respectively, to regions 107, 108, respectively, as well as predetermined regions 107 and 108, require localized heating for making the appropriate bends. Accordingly, with respect to the side walls, the non-pre-softened regions, such as 120 and 121 (FIG. 8) will maintain its native structural properties (i.e. that of −T6 temper). Although the use of an induction coil can be used (such as disclosed in U.S. Pat. No. 4,766,664), other types of conventional heating processes for temporarily increasing ductility to localized areas are also contemplated.

In the present invention, and after the longitudinal extrusions have been locally softened, each of the predetermined regions are bent to varying radii in predetermined directions relative to a specific frame configuration (e.g. a vehicular seat frame 100, FIG. 4, or a vehicular bumper 140, FIG. 5). It is contemplated that such bending be performed either manually, or on automated bending equipment pre-programmed with the particular bending requirements and bending locations relative to specific frame configurations.

Upon completion of the bending/formation of the particular frame portions, each of the locally softened regions are then allowed to harden toward their pre-softened hardness, as desired. The amount of hardness which will be regained will be dependent upon the specific type of alloy used for formation of the frame members, the amount of precipitation in the alloy prior to heating, intensity of the heat applied, as well as the length of time in which the heat is applied to the specific predetermined regions. Again, inasmuch as only preselected regions are exposed to the heat treating method, only those portions will be structurally altered. The remains of the structure will retain its uniform unaltered structural properties.

As previously mentioned, 6000 series aluminum alloys having a −T6 temper may, in many applications, possess the desired hardness for the particular frame structure being made. However, in prior art apparatus, it may not necessarily be the material actually used when tight bends/radii are required—inasmuch as the ductility of −T6 temper may not be high enough to avoid cracking at such tight bends. While more ductile aluminum alloys, such as 6000 series having a −T4 temper, may be capable of being bent at the desired radii without cracking, −T4 temper, for example, does not possess the same native hardness as that of −T6 temper. While it is known that −T4 temper can be heat treated so as to alter the hardness to approximately that of −T6, such prior art heat treatment has proven deficient inasmuch as it 1) requires heating of the entirety of the structure; 2) requires an exceptionally long aging time; and 3) typically provides a structure having non-uniform hardnesses throughout the structure.

The foregoing description and drawings merely explain and illustrate the invention and the invention is not limited thereto except insofar as the appended claims are so limited as those skilled in the art who have the disclosure before them will be able to make modifications and variations therein without departing from the scope of the invention.

We claim:

1. A frame apparatus for use in association with vehicles, said frame apparatus comprising:

one or more frame members, said one or more frame members each including one or more preselected attachment regions;

one or more cross-member means each having at least a first end operably attached to said one or more frame members at corresponding ones of said one or more preselected attachment regions;

slot means integrally formed through at least a portion of one or more said preselected attachment regions for operably accepting at least a portion of corresponding respective ones of said first ends of said one or more cross-member means; and securement means operably associated with at least a portion of each of said first end of said one or more cross-member means and said corresponding slot means for operably securing said first end of said one or more cross-member means within said corresponding slot means of said one or more frame members, said securement means further including at least a portion of said first end of said cross-member means being softened through localized heating and then deformed so as to maintain said restrained operable positioning of said first end within said corresponding slot means, said localized heating including means for precluding migration, and, in turn, conductivity, of heat beyond those portions of said cross-member means being softened.

2. The invention according to claim 1 wherein said operable acceptance of said at least a portion of said first end of said cross-member means within said corresponding slot means describes a joint therebetween said cross-member means and said one or more frame members:

said frame apparatus further including strength enhancement means operably associated with said joint for imparting increased structural integrity thereto, to, in turn, increase rigidity against imparted stress at said joint.

3. The invention according to claim 1 wherein each of said one or more frame members include at least one pre-softened region softened through localized heating at said pre-softened regions and at least one non-pre-softened region wherein said localized heating substantially precludes migration, and, in turn, conductivity, of heat beyond said pre-softened regions;

said at least one pre-softened region facilitating bending of said one or more frame portions at varying radii in any desired dimension.

4. The invention according to claim 1 wherein at least one of said one or more frame members are constructed of aluminum material from the group comprising 4000 to 6000-series alloys of varying hardnesses.

5. A process of manufacturing a frame apparatus of the type for use in association with vehicles, wherein the frame apparatus is constructed with one or more bendable frame members having preselected attachment regions located thereon, the process comprising the steps of:

forming slots in the one or more bendable frame members at the preselected attachment regions, wherein the slots include an inner peripheral surface and an outer peripheral surface;

softening predetermined areas on the one or more frame members through localized heating wherein said localized heating substantially precludes migration, and, in turn, conductivity, of heat beyond said pre-softened areas;

bending the one or more bendable frame members at each of the predetermined areas to varying predetermined radii in predetermined directions relative to a specific frame configuration;

at least partially hardening the predetermined softened areas after bending the one or more bendable frame members so as to increase structural integrity to the predetermined areas;

forming at least one cross-member with at least a first end having a distal end, a proximal end and a cross-sectional configuration;

softening the proximal end of the at least one cross-member through localized heating;

inserting the first end of the at least one cross-member in corresponding ones of the slots in the bent one or more frame members so as to form a joint therebetween each respectively;

deforming at least a portion of the softened proximal ends of each of the first ends so as to alter the pre-deformed cross-sectional configuration of same to, in turn, create a detent portion operably positioned adjacent the inner peripheral surface of a corresponding slot for precluding over insertion of the first ends into the corresponding slots in the one or more frame members; and hardening the locally softened proximal ends back toward the pre-softened hardnesses.

6. The invention according to claim 5 in which the process of manufacturing a frame apparatus further includes the steps of:

softening the distal ends of the first ends of the at least one cross-member through localized heating;

deforming at least a portion of the softened distal ends of the first ends of the at least one cross-member so as to form a flange portion operably positioned adjacent the outer peripheral surface of corresponding ones of the slots; and hardening the locally softened distal ends back toward their pre-softened hardnesses, after the step of softening the proximal ends of the at least one cross-member through localized heating, the flange portion and the detent portion compressing against the outer and inner peripheral surface, respectively, of the slots, so as to substantially lock the first ends within the corresponding slots.

7. The process according to claim 5 in which the step of bending the one or more bendable frame members at each of the predetermined areas to varying predetermined radii in predetermined directions relative to a specific frame configuration further includes the step of positioning the bent portions of the one or more bendable outer frame members in any desired dimension so as to form a frame apparatus constructed from one or more frame members.

8. A frame apparatus for use in association with vehicles, said frame apparatus comprising:

one or more frame members, at least one of said one or more frame members including at least one pre-softened region through localized heating at said pre-softened regions, and at least one non pre-softened region wherein said localized heating substantially precludes migration, and, in turn, conductivity, of heat beyond said pre-softened regions, said pre-softened regions facilitating bending of said one or more frame members at varying radii in any desired dimension without significantly structurally altering material or structural properties of said non pre-softened regions.

9. The invention according to claim 8 wherein at least one of said one or more frame members is constructed of aluminum material from the group comprising 4000 to 6000 series alloys of varying hardness.

10. The invention according to claim 8 wherein at least one of the bent one or more frame members comprises a vehicular bumper.

11. The invention according to claim 8 wherein at least one of the bent one or more frame members comprises a vehicular seat frame.

12. The invention according to claim 8 wherein at least one of the bent one or more frame members comprises at least a portion of an automotive space frame.

13. A process of manufacturing a frame apparatus for use in association with various vehicles, wherein the frame apparatus is constructed with one or more bendable frame members, the process comprising the steps of:

softening predetermined areas on the one or more frame members through localized heating while maintaining at least one predetermined area on the one or more frame members in a non-softened condition wherein said localized heating substantially precludes migration, and, in turn, conductivity, of heat beyond said pre-softened regions;

bending the one or more bendable frame members at each of the predetermined softened areas to varying predetermined radii in predetermined directions relative to a specific frame configuration; and hardening the predetermined softened areas to a desired hardness after bending the one or more bendable outer frame members so as to obtain a desired structural integrity of the previously predetermined softened areas without significantly altering structural properties of the non-softened areas.

14. The invention according to claim 13 in which the process of manufacturing a frame structure apparatus further includes the step of extruding an aluminum billet so as to form one or more substantially straight extrusions to be used as the one or more bendable frame members.

15. A product made in accordance with the process of claim 13 wherein the product comprises a vehicular bumper.

16. A product made in accordance with the process of claim 13 wherein the product comprises a vehicular seat frame.

17. A product made in accordance with the process of claim 13 wherein the product comprises a vehicular space frame.

* * * * *